Patented Dec. 1, 1942

2,303,498

UNITED STATES PATENT OFFICE 2,303,498

SULPHONIC ACID ESTERS OF KETOLS OF THE CYCLOPENTANOPOLYHYDROPHENANTHRENE SERIES AND PROCESS OF MAKING SAME

Tadeus Reichstein, Basel, Switzerland, assignor to the firm of Roche-Organon Incorporated, Nutley, N. J.

No Drawing. Application January 10, 1941, Serial No. 374,016. In the Netherlands February 13, 1940

5 Claims. (Cl. 260—397.4)

It has been found that sulphonic acid esters of ketols of the cyclopentanopolyhydrophenanthrene series may be prepared by treating compounds of this series containing a side chain of the type —CO—CHN$_2$ at the 17-carbon atom with sulphonic acids in a manner of itself known. Thereby it is advantageous to operate in presence of an anhydrous, neutral solvent and to use a slight excess of the sulphonic acid (50 to 100 percent) whilst heating gently. The reaction is complete, for example, in benzene solution at 50° C., in about 15 minutes. Ether, dioxane, etc., are also very suitable solvents for this process.

The saturated or unsaturated compounds of the cyclopentanopolyhydrophenanthrene series containing a side chain of the type —CO—CHN$_2$ in 17-position, used as parent materials may moreover be substituted in any desired manner and have any desired steric configuration. As substituents there are named, for example, free or substituted hydroxyl groups, free keto-groups or keto-groups in the form of enol derivatives, halogen atoms, free or substituted amino-groups, free or esterified carboxyl groups, alkyl groups and the like.

The sulphonic acids which may be used in the process are of the formula R—SO$_3$H, R being a substituted or unsubstituted alkyl, alkenyl, aryl or aralkyl group. Thus there may be used methyl, ethyl-, ethylene-, propylene-sulphonic acid, benzene-, toluene-, xylene- or nitrobenzene-sulphonic acids, halogenbenzene sulphonic acids, such as chlorobenzene- and iodobenzene sulphonic acids, furthermore amino-benzene sulphonic acids, such as sulphanilic acid etc.

The new sulphonic acid esters have interesting properties, both as regards their physiological action and as regards their use for further conversions.

Example 1

3 gms. of diazo-21-pregnene-5-ole-3-one-20 are warmed to 50° C. with 2 gms. of anhydrous toluene-sulphonic acid in anhydrous benzene for 15 minutes, when the evolution of gas ceases. The benzene solution is washed, first with water, then with dilute soda solution and finally with water, and evaporated; the residue is recrystallized from ether. The 21-toluene-sulphonate of pregnene-5-diole-3,21-one-20 is obtained in a yield of about 70 percent. After recrystallizing several times from ether-petroleum ether, the melting point of the colorless crystals is 124–125°.

Example 2

Starting with acetoxy-3-diazo-21-pregnene-5-one-20, the toluene-sulphonate of acetoxy-3-pregnene-5-ole-21-one-20 is obtained in the same manner, the reaction mixture being preferably subjected to a chromatographic purification and the recrystallized from etherpentane. The ester seems to be polymorphic; at least, crystals having melting points of 114–115° C. and 119–120° C. are obtained from ether-petroleum ether. Yield about 60 percent.

When starting from another ester, like the propionate or benzoate, the correspondingly substituted toluene sulphonate is obtained.

Example 3

Starting with diazo-progesterone (diazo-21-pregnene-4-dione-3,20) in the same manner, the toluene sulphonic acid ester of desoxycorticosterone may be obtained, which, after recrystallization from ether, forms colorless crystals of M. P. 169–170° C.

It is obvious that other sulphonic acids, namely especially those referred to in the specification, may be used for the purposes of the conversion and other diazo-ketones may be used as starting materials, like those derived from saturated and unsaturated poly-hydroxy- or poly-keto-etio-cholanic acids, containing the substituents for example in 3, 7, 11, 12 and/or 17-position.

What I claim is:

1. Process for the manufacture of sulphonic acid esters of ketols of the cyclopentanopolyhydrophenanthrene series, which comprises treating compounds of this series containing a side chain —CO—CHN$_2$ attached to the 17-carbon atom with sulphonic acids.

2. Process for the manufacture of sulphonic acid esters of ketols of the cyclopentanopolyhydropenanthrene series, which comprises treating compounds of this series containing a side chain —CO—CHN$_2$ attached to the 17-carbon atom with sulphonic acids in presence of an anhydrous neutral solvent.

3. The compounds of the cyclopentanopolyhydrophenanthrene series, containing in 17-position a side chain of the formula

—CO—CH$_2$—OSO$_2$—R wherein R stands for a member of the group consisting of alkyl, alkenyl, aralkyl, aryl, alkaryl, nitro-aryl, halo-aryl and amino-aryl groups.

4. The 21-sulphonic acid esters of the compounds of the group consisting of pregnene-5-diole-3,21-one-20 and its 3 acetates.

5. The sulphonic acid esters of desoxycorticosterone.

TADEUS REICHSTEIN.